(12) United States Patent  (10) Patent No.: US 8,673,382 B2
Jordan et al.  (45) Date of Patent: Mar. 18, 2014

(54) THICK JUICE BEVERAGES

(75) Inventors: Rachel L. Jordan, Palatine, IL (US);
Bryan Hitchcock, Mundelein, IL (US);
Jeanette Stephen, Arlington Heights, IL
(US); Lisa Omueti, New York, NY (US);
Jeffrey D. Mathews, Naperville, IL (US)

(73) Assignee: Tropicana Products, Inc., Bradenton, FL (US)

( * ) Notice: Subject to any disclaimer, the term of this patent is extended or adjusted under 35 U.S.C. 154(b) by 91 days.

(21) Appl. No.: 12/951,950

(22) Filed: Nov. 22, 2010

(65) Prior Publication Data

US 2011/0129591 A1    Jun. 2, 2011

Related U.S. Application Data

(60) Provisional application No. 61/263,442, filed on Nov. 23, 2009.

(51) Int. Cl.
*A23L 2/02*    (2006.01)
(52) U.S. Cl.
USPC ............ 426/599; 426/519; 426/615; 426/616
(58) Field of Classification Search
USPC ................................. 426/615, 616, 599, 519
See application file for complete search history.

(56) References Cited

U.S. PATENT DOCUMENTS 3,118,770 A * 1/1964 Harrell ........................... 426/482
4,413,017 A   11/1983 Loader
4,690,827 A   9/1987 Kupper et al.
5,232,726 A   8/1993 Clark et al.
5,260,086 A   11/1993 Downton et al.
5,385,748 A   1/1995 Bunger et al.
5,474,793 A   12/1995 Meyer et al.
6,383,546 B1  5/2002 Powrie et al.
6,730,343 B2  5/2004 Chung et al.
2003/0064140 A1 4/2003 Lineback et al.
2004/0022877 A1 2/2004 Green et al.
2004/0126474 A1 7/2004 Letourneau et al.
2004/0170731 A1 9/2004 Subramaniam et al.

(Continued)

FOREIGN PATENT DOCUMENTS

CN    1909805    2/2007
EP    0 485 030   5/1992

(Continued)

OTHER PUBLICATIONS

"Understanding Mesh Sizes and Microns", www.skylighter.com/fireworks/making-fireworks-projects/screen-mess-metal-particl.. May 31, 2013., p. 1.*

(Continued)

*Primary Examiner* — Helen F Heggestad
(74) *Attorney, Agent, or Firm* — Banner & Witcoff, Ltd.

(57) ABSTRACT

A thickened juice beverage contains juice and homogenized pulp and/or homogenized finisher-derived solids. The beverage has a measured viscosity between about 50 and about 125 cps at the time of manufacture and the pulp or solids do not significantly change the smoothness or taste profile of the juice. The homogenized pulp and homogenized finisher-derived solids have an average particle size of less than 1000 microns and 1500 microns, respectively. Optionally, the juice beverage meets the standard of identity of a 100% juice, such as an orange juice.

21 Claims, 2 Drawing Sheets

(56) References Cited

U.S. PATENT DOCUMENTS

| | | |
|---|---|---|
| 2004/0265465 A1 | 12/2004 | Daniels et al. |
| 2005/0058763 A1 | 3/2005 | Cetrulo et al. |
| 2006/0099277 A1 | 5/2006 | Jewett, Jr. et al. |
| 2006/0182820 A1 | 8/2006 | Kluetz et al. |
| 2007/0110875 A1 | 5/2007 | Keithly et al. |
| 2009/0035441 A1 | 2/2009 | Hirashima et al. |

FOREIGN PATENT DOCUMENTS

| | | |
|---|---|---|
| JP | 10 210956 | 8/1998 |
| JP | 2001 128637 | 5/2001 |
| RU | 2202257 | 4/2003 |
| WO | 0184965 | 11/2001 |
| WO | 2005/087200 A1 | 9/2005 |

OTHER PUBLICATIONS

Search Report and Written Opinion in related International Patent Application No. PCT/US2010/057778, dated Mar. 2, 2011.

Will, et al., "Processing and Analytical Characterisation of Pulp-Enriched Cloudy Apple Juices," Elsevier, LWT—Food Science and Technology, vol. 41, No. 10, 2008, pp. 2057-2063.

\* cited by examiner

THICK JUICE BEVERAGES

CROSS REFERENCE TO RELATED APPLICATIONS

This application claims priority to Provisional Application, U.S. Ser. No. 61/263,442, filed on Nov. 23, 2009, which is incorporated herein by reference in its entirety.

FIELD OF THE INVENTION

This invention relates to juice beverages that have increased thickness, due to the addition of such ingredients as homogenized pulp or solids derived from the juice production process.

BACKGROUND

Beverages of various improved and new formulations are desirable to achieve desired nutritional characteristics, flavor, shelf life, and other objectives. For example, it would be desirable to provide a juice beverage that exhibits increased thickness. Currently, juices comprise varying amounts of solids supplied by sugars, pulp, membranes, and the like. Certain juices have pulp and other solids removed, while others have extra pulp and solids added, depending on the consumer preference.

It would be desirable to provide a thickened drinkable juice beverage that exhibits a smooth mouthfeel and does not exhibit reduced flavor from the thickening agent. Typically, thickness, or body, is provided in foods and beverages by adding known thickening agents such as alginates, carrageenan, sodium carboxymethylcellulose sodium, guar gum and xanthan gum, which usually remain substantially suspended. One drawback to employing such thickening agents in juice beverages is that the mouthfeel of the finished beverage may not match or be consistent with the mouthfeel expected by a consumer for a juice product. Moreover, a juice beverage containing such thickening agents will not meet the standard of identity of a 100% juice or a not from concentrate (NFC) juice. Accordingly, it would be advantageous to provide a thickened juice beverage that contains only fruit or vegetable components, in order to meet the desired juice standard(s) of identity. The thickness of the juice beverage may provide a nectar-like mouthfeel to the beverage.

It is an object of the invention to provide beverages and other beverage products having desirable appearance, taste and health properties. It is an object of at least certain embodiments of the invention to provide juice beverages having improved formulations, including high viscosity. It is another object of the invention to provide juice beverages having increased fiber content. It is a further object of the invention to make use of solids obtained from juice extraction processes, which might otherwise be discarded as waste. These and other objects, features and advantages of the invention or of certain embodiments of the invention will be apparent to those skilled in the art from the following disclosure and description of exemplary embodiments.

SUMMARY

In accordance with one aspect, a thickened juice beverage is provided that contains juice and homogenized pulp. The beverage has a measured viscosity between about 50 and about 125 cps at the time of manufacture and the pulp does not impart off-flavors to the beverage. The homogenized pulp has an average particle size of between about 40 and about 700 μm, provides a smooth mouthfeel to the beverage, and may include pulp from more than one varietal.

In accordance with another aspect, a thickened juice beverage is provided that contains juice and homogenized finisher-derived solids. The homogenized finisher-derived solids have an average particle size of between about 40 and about 1400 μm and provide a smooth mouthfeel to the beverage. Optionally, the juice beverage meets the standard of identity of a 100% juice, such as an orange juice.

In accordance with a further aspect, a thickened juice beverage is provided that contains juice and both homogenized pulp and homogenized finisher derived solids, which provide a smooth mouthfeel to the beverage. The beverage may have a measured viscosity between about 50 and about 125 cps at the time of manufacture and the pulp and solids do not impart significant off-flavors to the beverage.

It will be appreciated by those skilled in the art, given the benefit of the following description of certain exemplary embodiments of the juice beverage and other juice beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF EMBODIMENTS

Figure 1:
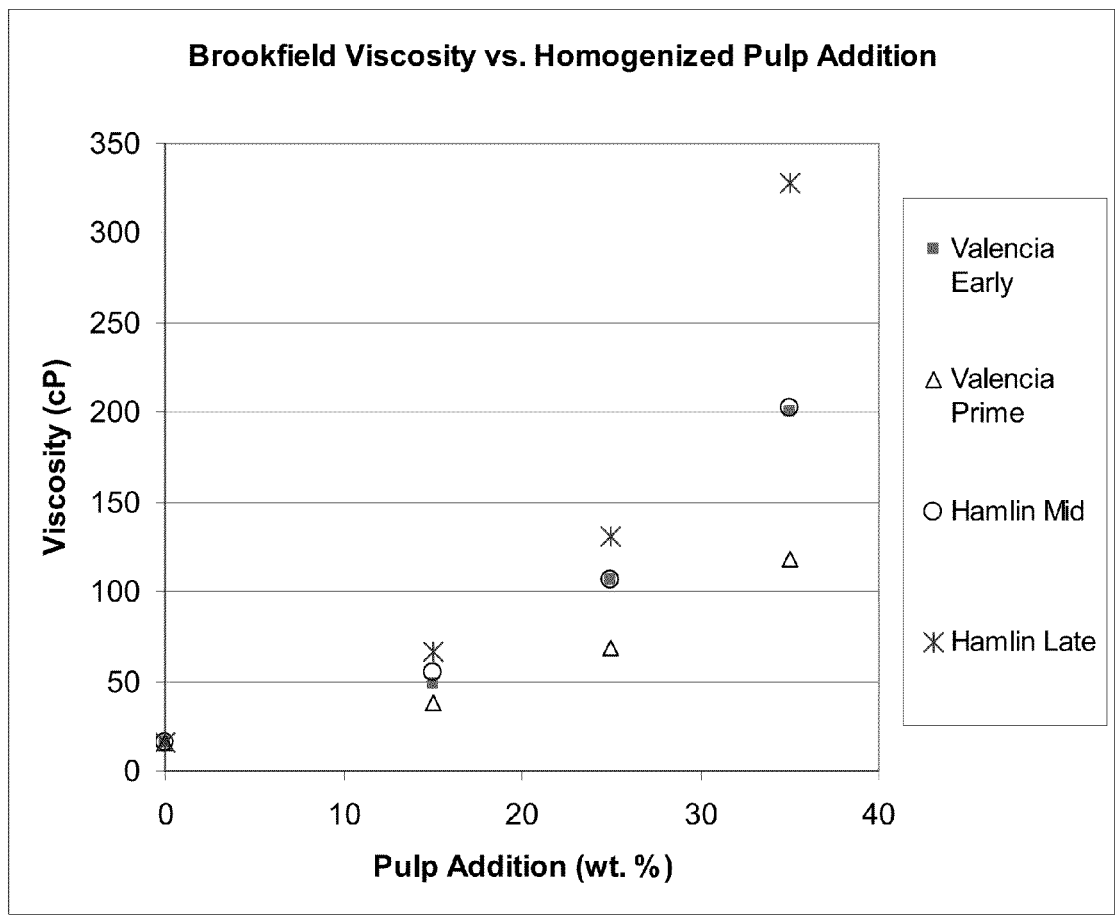
FIG. 1 is a graph of measured viscosity vs. amount of homogenized pulp addition for different orange varietals.

Not from concentrate, or NFC, juices tend to be popular with consumers for numerous reasons, such as their fresh taste and nutritional profile. These NFC juices must meet particular standard of identity criteria. Among these criteria are brix minimums and brix-to-acid ratio minimums. For example, the US Food and Drug Administration sets a standard for juices such as orange juice. In this regard 21 CFR Section 146.140, incorporated by reference hereinto, states that finished pasteurized orange juice is to contain not less than 10.5 percent by weight of orange juice soluble solids, exclusive of the solids of any added sweetening ingredients. This FDA regulation further states that the ratio of brix to grams of citric acid per 100 ml of juice is not less than a 10 to 1 ratio. The juice industry recognizes these criteria for pasteurized orange juice or single strength orange juice as applying to NFC orange juice. It will be understood that these standard of identity criteria are used herein with respect to NFC orange juice or pasteurized single strength orange juice. This same concept of standard of identity criteria applies as well to other pasteurized single strength juices.

Similarly, the US Food and Drug Administration sets a standard for food labeling, including juice labeling. 21 CFR Section 101.30 states that beverages containing "100 percent juice and non-juice ingredients that do not result in a diminution of the juice soluble solids or, in the case of expressed juice, in a change in the volume, when the 100 percent juice declaration appears on a panel of the label that does not also bear the ingredient statement, it must be accompanied by the phrase "with added _____," the blank filled in with a term such as "ingredient(s)," "preservative," or "sweetener,"

as appropriate (e.g., "100% juice with added sweetener"), except that when the presence of the non-juice ingredient(s) is declared as a part of the statement of identity of the product, this phrase need not accompany the 100 percent juice declaration." Consequently, since homogenized pulp and finisher-derived solids are ingredients included within the standard of identity of juice, the juice beverages of certain embodiments of the invention may be labeled as "100 percent juice."

In certain embodiments, a juice beverage is provided that comprises juice and homogenized pulp. It was unexpected that a drinkable juice beverage having a smooth mouthfeel and a measured viscosity of between about 50 centipoise (cps) and about 125 cps could be provided without significantly altering the flavor of the juice, such as by providing off-flavors from the pulp. In certain embodiments, the viscosity may be between about 80 and 100 cps. Drinkable juice beverages having higher viscosities, such as up to about 230 cps, may also be achieved, but with a more noticeable change in taste. The homogenized pulp also provides fiber to the juice beverage, which can result in a greater feeling of satiety following consumption of the beverage, as compared to a typical juice beverage having a lower measured viscosity.

Juice pulp typically comprises particles of the soft, fleshy part of the fruit or vegetable, which has been removed from the fruit or vegetable along with the juice during extraction. For instance, citrus pulp may include fruit vesicles that contain juice, or fragments of fruit vesicles or membranes. According to certain embodiments of the invention, homogenized citrus pulp may contain more than one citrus varietal to provide a specific selected flavor profile.

Homogenization of juice pulp will decrease the size of the pulp particles such that they are sufficiently small to provide a homogeneous mouthfeel and very slowly settle out of suspension. For example, the suspended pulp typically settles to the bottom of the beverage within about 24-32 hours. Homogenized pulp may be prepared using a variety of processes, such as using methods disclosed in U.S. Pat. No. 4,690,827. In this patent, a method is described in which a pulp slurry is passed through a homogenizer at high pressure to reduce the average size of the pulp particles. Numerous homogenizer settings may be successfully used to decrease the pulp particle size, such as operating the homogenizer at a pressure of at least 19 MPa. Alternatively, the homogenizer may be a two stage homogenizer and operated at a slurry volume rate of rate 6500 liters per hour, at 25 MPa during the first stage and 5 MPa during the second stage, as described in U.S. Pat. No. 4,690,827.

Homogenized pulp may also be prepared by grinding pulp, for example as disclosed in U.S. Pat. No. 5,162,128. Pulp, optionally dried pulp, may be reduced such that the particles have a diameter of less than about 1000 microns, and at least 50% of the particles have a size less than 700 microns, preferably less than about 500 microns. This process employs a carrier-gas-swept jet mill configured to have an internal design and feed rate sufficient to grind the pulp to the desired particle size distribution, followed by an air-solid separation. The homogenized pulp according to embodiments of the invention may have an approximate particle size diameter between about 40 microns and about 1000 microns, or between about 40 microns and about 700 microns, or between about 40 microns and about 500 microns, or between about 40 microns and about 400 microns. As used herein, the terms "micron" and "micrometer" are used interchangeably, and may be represented as "$\mu m$".

The typical viscosity of single-strength juice will depend on the type of juice. For example, tomato juice has a high viscosity, while grape juice has a low viscosity, and orange juice generally has a viscosity of between about 10-35 cps. The juices according to embodiments of the invention, however, may comprise a viscosity between about 50 cps and about 125 cps, or between about 80 cps and about 100 cps. These high viscosities may be achieved by including homogenized pulp in an amount between about 15% by weight and about 45% by weight of the total juice beverage. Surprisingly, this large amount of homogenized pulp does not negatively impact the flavor of the juice beverage, even though the homogenized pulp comprises both juice that had been contained within juice vesicles and fruit membranes. In particular, the homogenized pulp does not significantly introduce off-flavors to the juice beverage or decrease the perception of positive flavor attributes. An advantage of incorporating homogenized pulp in a juice beverage is that pulp originates from the juice process, thus the final juice beverage may be labeled as 100% juice.

In alternative embodiments, juice beverages comprising a viscosity of about 50-125 cps may be prepared that are not 100% juice. For example, thickened juice beverages may comprise from concentrate (FC) juice, which is juice that has been previously concentrated to remove water, and then diluted to provide at least a minimum specified Brix, depending on the type of juice. Orange juice, for instance, must have a minimum Brix level of 11.8, while grapefruit juice must have a minimum Brix level of 10.0. Further embodiments include thickened juice beverages comprising reduced calorie, light, or low-calorie juice. Such beverages typically comprise juice, added water, and often other added ingredients to provide a desired taste, such as non-nutritive sweeteners.

In certain embodiments, a juice beverage having a viscosity of about 50-125 cps is provided that comprises juice and finisher-derived solids. The term "finisher-derived solids" as used herein refers collectively to solids removed from juice that has been extracted from fruits and/or vegetables. Such solids may include, without limitation, material from peel, seeds, membranes, cellulosic materials and sensible pulp such as bitable fruit pulp, fruit vesicles, and/or fruit sac, which are typically removed from the juice in a finishing step. Often, the separation of solids during the extraction process results in a slurry having a consistency similar to applesauce, which is obtained from the finisher, which is commonly referred to as the "tight end". Suitable finishers are available from Brown International Corporation (Winter Haven, Fla.) or JBT Corporation (Chicago, Ill.). The finisher-derived solids may be homogenized via high shear homogenization or grinding methods as described above, to provide particle sizes below about 1500 microns ($\mu m$), for instance between about 40 $\mu m$ and about 1400 $\mu m$, or between about 40 and about 1200 $\mu m$, or between about 40 and about 1000 $\mu m$, or between about 40 and about 800 $\mu m$, or between about 40 and about 600 $\mu m$.

Homogenized finisher-derived solids tend to provide less viscosity to beverages than homogenized pulp, thus a larger amount of the homogenized solids than homogenized pulp might be needed to obtain a desired final juice beverage viscosity. However, homogenized finisher-derived solids are usually included in a juice in a lower amount than homogenized pulp due to the presence of some flavors that may have a negative impact, such as bitter flavors provided by peel and membrane solids. Accordingly, embodiments of the invention include juices comprising homogenized finisher-derived solids in an amount between about 15% by weight and about 40% by weight of the total juice beverage. An advantage to employing finisher-derived solids is that a thickened juice beverage may be prepared using inexpensive juice extraction byproducts that might otherwise be disposed of as waste.

In certain embodiments, both homogenized pulp and homogenized finisher-derived solids are incorporated into juice beverages to provide beverages having a viscosity of about 50-125 cps. The inclusion of both pulp and solids provides a combination of the advantages of both materials, as well as the opportunity to specifically select amounts and varietals of homogenized pulp and homogenized finisher-derived solids based on the characteristics of the materials. For example, the amount of homogenized pulp and/or homogenized finisher-derived solids required to prepare a juice beverage having a particular viscosity may vary over the growing season of the fruit. This may be due to fruit physiology that changes during the season, such as the levels and types of pectin present in the fruit. Therefore, when homogenized finisher-derived solids exhibit a large amount of bitterness taste based on the varietal or time of the growing season, a smaller amount of the homogenized finisher-derived solids may be included while a larger amount of homogenized pulp may be added to a juice beverage achieve the desired viscosity. Similarly, during a time when a greater amount of homogenized pulp is needed to obtain the desired juice beverage viscosity, the pulp may be supplemented with the less expensive homogenized finisher-derived solids.

To provide desirable flavor and mouthfeel of the juice beverage, the juice employed may comprise a blend of different juices. For instance, more than one type of fruit or vegetable juice may be combined in juice beverages of the current invention. In certain embodiments, when the juice is orange juice, it may comprise a blend of orange varietals to achieve a specific flavor profile. For example, when a substantial amount of homogenized finisher-derived solids are added to the juice, it may be beneficial to select varietals that will provide complementary characteristics to offset any negative flavors imparted by the finisher-derived solids.

It should be understood that juice beverages and other juice beverage products in accordance with this disclosure may have any of numerous different specific formulations or constitutions. In general, an NFC and/or 100% juice beverage in accordance with this disclosure typically comprises juice and fruit or vegetable solids. Exemplary solids which may be suitable for at least certain formulations in accordance with this disclosure include homogenized pulp and/or homogenized finisher-derived solids. The formulation of a beverage product in accordance with this disclosure can vary to a certain extent, depending upon such factors as the product's intended market segment, its desired nutritional characteristics, flavor profile and the like.

For example, it will generally be an option to add further ingredients to the formulation of a particular beverage embodiment, including any of the beverage formulations described below in particular if the juice beverage is not required to meet a specific standard of identity. Additional (i.e., more and/or other) sweeteners may be added, flavorings, inclusions (e.g., fruit pieces, fiber, oat flour or nuts), electrolytes, vitamins, tastants, masking agents and the like, flavor enhancers, and/or carbonation typically can be added to any such formulations to vary the taste, mouthfeel, nutritional characteristics, etc.

Juice is a basic ingredient in the beverages disclosed here, typically being the vehicle or primary liquid portion in which the remaining ingredients are dissolved, emulsified, suspended or dispersed. Juices suitable for use in at least certain exemplary embodiments of the beverage products disclosed here include, e.g., fruit, vegetable and berry juices. Juices can be employed in the present invention in the form of a single-strength juice, NFC juice, 100% pure juice, juice concentrate, juice puree, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a beverage having the desired flavor.

Examples of suitable juice sources include orange, lemon, lime, tangerine, mandarin orange, tangelo, pomelo, grapefruit, grape, red grape, sweet potato, tomato, celery, beet, lettuce, spinach, cabbage, watercress, rhubarb, carrot, cucumber, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, lychee, plum, prune, date, currant, fig, etc. Numerous additional and alternative juices suitable for use in at least certain exemplary embodiments will be apparent to those skilled in the art given the benefit of this disclosure.

In embodiments for which the juice beverage is not 100% juice or is from concentrate, water may instead be the vehicle or primary liquid portion in which the remaining ingredients are included. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain embodiments, water is present at a level of from about 1% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

Acid used in beverages disclosed here can serve any one or more of several functions, including, for example, providing antioxidant activity, lending tartness to the taste of the beverage, enhancing palatability, increasing thirst quenching effect, modifying sweetness and acting as a mild preservative by providing microbiological stability. Ascorbic acid, commonly referred to as "vitamin C", is often employed as an acidulant in beverages to also provide a vitamin to the consumer. Any suitable edible acid may be used, for example citric acid, malic acid, tartaric acid, phosphoric acid, ascorbic acid, lactic acid, formic acid, fumaric acid, gluconic acid, succinic acid and/or adipic acid.

The acid can be used in solid or solution form, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc. The amount of acid in the gel beverage concentrate may range from about 1.0% to about 2.5%, between about 1.5% and about 2.0%, or about 1.8% by weight of the gel beverage concentrate. In certain embodiments of the invention, all of the acid included in a beverage composition may be provided by citric acid.

The pH of at least certain exemplary embodiments of the beverages disclosed here can be a value within the range of 2.5 to 4.0. The acid in certain exemplary embodiments can enhance beverage flavor. Too much acid can impair the beverage flavor and result in sourness or other off-taste, while too little acid can make the beverage taste flat and reduce microbiological safety of the product. It will be within the ability of those skilled in the art, given the benefit of this disclosure, to select a suitable acid or combination of acids and the amounts of such acids for the acidulant component of any particular embodiment of the beverage products disclosed here.

Sweeteners suitable for use in various embodiments of the beverages disclosed here include nutritive and non-nutritive, natural and artificial or synthetic sweeteners. In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate and/or others. Typically, such sweeteners are present in a gel beverage concentrate in an amount of from about 0.5% to about 35% by weight, such as from about 15 to about 25% by weight. Further, such sweeteners are present in an amount of from about 0.1% to about 20% by weight of a finished beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

Suitable non-nutritive sweeteners and combinations of sweeteners are selected for the desired nutritional characteristics, taste profile for the beverage, mouthfeel and other organoleptic factors. Non-nutritive sweeteners suitable for at least certain exemplary embodiments include, but are not limited to, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain embodiments the sweetener comprises acesulfame potassium. Other non-nutritive sweeteners suitable for at least certain exemplary embodiments include, for example, *Stevia rebaudiana* extracts, rebaudioside A, sorbitol, mannitol, xylitol, glycyrrhizin, D-tagatose, erythritol, meso-erythritol, maltitol, maltose, lactose, fructo-oligosaccharides, Lo Han Guo powder, xylose, arabinose, isomalt, lactitol, maltitol, trehalose, and ribose, and protein sweeteners such as thaumatin, monellin, brazzein, L-alanine and glycine, related compounds, and mixtures of any of them. Lo Han Guo, *Stevia rebaudiana* extracts, rebaudioside A, and monatin and related compounds are natural non-nutritive potent sweeteners.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

Preservatives may be used in certain embodiments of the beverages disclosed here. That is, certain exemplary embodiments contain an optional dissolved preservative system. Solutions with a pH below 4.6 and especially those below 3 typically are "microstable," i.e., they resist growth of microorganisms, and so are suitable for longer term storage prior to consumption without the need for further preservatives. However, an additional preservative system can be used if desired. Furthermore, embodiments of juice beverages having low acidity generally comprise a preservative system. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoic acid, benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), lauryl arginate ester, cinnamic acid, e.g., sodium and potassium cinnamates, polylysine, and antimicrobial essential oils, dimethyl dicarbonate, and mixtures thereof, and antioxidants such as ascorbic acid, EDTA, BHA, BHT, TBHQ, EMIQ, dehydroacetic acid, ethoxyquin, heptylparaben, and combinations thereof.

Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure. In certain embodiments of the invention, sorbic acid or its salts (sorbates) may be employed as preservatives in the beverage products, such as in an amount of less than 0.1% by weight of a gel beverage concentrate.

Other methods of beverage preservation suitable for at least certain exemplary embodiments of the beverage products disclosed here, such as ready-to-drink beverages, include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

The beverage products disclosed here optionally contain a flavoring composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, pomegranate, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of the above-mentioned flavors. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide can be used to provide effervescence to certain exemplary embodiments of the beverages disclosed here, such as frozen slush beverages or fountain beverages. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $CO_2$ level up to about 7.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of water at 60° F. (16° C.) temperature and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

The juice beverages disclosed here may contain additional ingredients, including, generally, any of those typically found in beverage formulations. Examples of such additional ingredients include, but are not limited to, salt, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_3$ (nicotinamide), $B_4$ (adenine), $B_5$ (pantothenic acid, calcium), $B_6$ (pyridoxine HCl), $B_{12}$ (cyanocobalamin), and $K_1$ (phylloquinone), niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

EXAMPLES

Example 1

A thickened 100% juice orange juice beverage was prepared having the ingredients listed in Table 1 below. The specific amounts of each ingredient are also provided in the table, and the beverage had a measured viscosity of about 100 cps.

TABLE 1

Ingredients for a thickened NFC orange juice beverage

| Ingredient | Amount (weight % of total beverage) |
|---|---|
| Not From Concentrate Hamlin Orange Juice | 37.5 |
| Not From Concentrate Valencia Orange Juice | 37.5 |
| Homogenized Hamlin Orange Pulp | 25 |

Example 2

A thickened from concentrate orange juice beverage may be prepared having the ingredients listed in Table 2 below. Such a beverage will have a measured viscosity between about 80 cps and 100 cps.

TABLE 2

Ingredients for a thickened FC orange juice beverage

| Ingredient | Amount (weight % of total beverage) |
|---|---|
| Water | 56 |
| Orange Juice Concentrate (65 Brix) | 14 |
| Homogenized Finisher Derived Solids | 40 |

Example 3

The effect of orange varietals on the mouthfeel and viscosity of juice beverages comprising homogenized pulp was tested. The orange varietals employed were Valencia Early, Valencia Prime, Hamlin Mid and Hamlin Late. The homogenized pulp had been stored frozen, and then thawed prior to addition to the base juice. The viscosity was measured using a Brookfield Viscometer (Model RVT, Spindle #1, Brookfield Engineering Laboratories, Inc., Middleboro, Mass.).

TABLE 3

Measured viscosity of juice containing different homogenized pulp orange varietals

| Pulp Addition (weight %) | Valencia Early | Valencia Prime | Hamlin Mid | Hamlin Late |
|---|---|---|---|---|
| 0 | 16.0 cps | 16.0 cps | 16.0 cps | 16.0 cps |
| 15 | 48.0 cps | 37.5 cps | 55.0 cps | 66.5 cps |
| 25 | 107.0 cps | 69.0 cps | 106.0 cps | 131.0 cps |
| 35 | 200.0 cps | 118.0 cps | 202.0 cps | 327.5 cps |

FIG. 1 shows a plot of the measured viscosity of the juice beverages versus the amount of homogenized pulp added, for each of the orange varietal pulp sources. FIG. 1 illustrates that inclusion of the same amount of different orange varietals results in different measured viscosities. These results become more pronounced as larger amounts of homogenized pulp are added. For example, the measured viscosity for a juice beverage containing 35% by weight Valencia Prime homogenized pulp was 118 cps, while the juice beverages including 35% by weight Valencia Early or Hamlin Mid had measured viscosities of 200 cps and 202 cps, respectively. Accordingly, the amount of Valencia homogenized pulp required to prepare a juice beverage having a specific viscosity will vary with the harvesting season.

Figure 2:
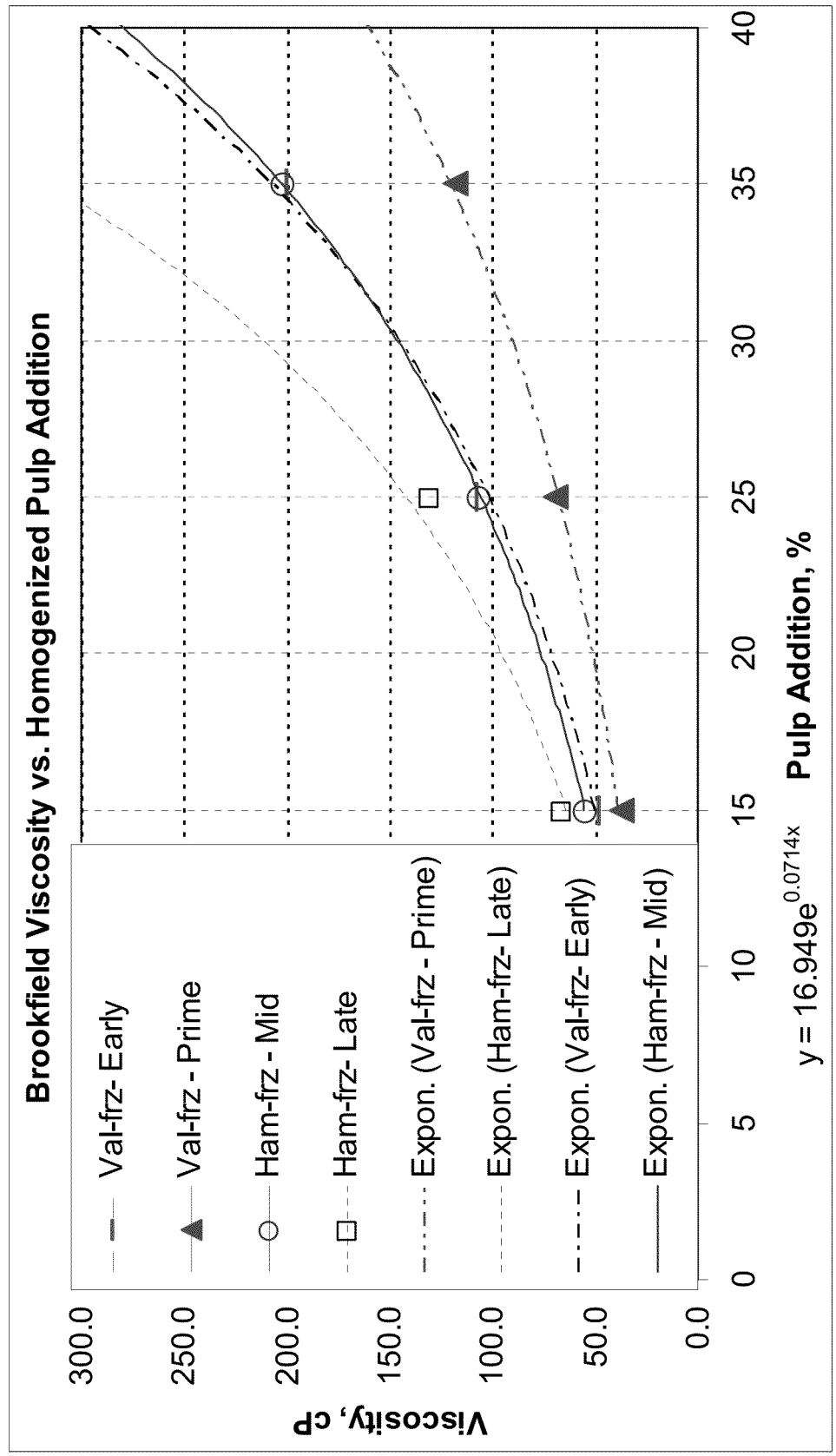
FIG. 2 is a graph of measured viscosity vs. amount of homogenized pulp addition for different orange varietals, including data trend lines.

FIG. 2 shows a plot of exponential trend lines for the juice beverages containing homogenized pulp from the different orange varietals. The calculated trend line equations allow estimation of approximately how much of each type of homogenized pulp should be added to a juice beverage to provide a particular desired viscosity. Table 4 below displays the calculated amounts of homogenized pulp needed to produce a juice beverage having a viscosity of about 100 cps.

TABLE 4

Calculated weight % of homogenized pulp from different orange varietals to include in a juice beverage to achieve a measured viscosity of 100 cps

| Homogenized Pulp Type | y = 100; x= | Multiplier | $e^{\hat{}}$ |
|---|---|---|---|
| Mid Hamlin | 24.2% | 20.77 | 0.065 |
| Late Hamlin | 20.7% | 19.332 | 0.0797 |
| Early Valencia | 24.9% | 16.949 | 0.0714 |
| Prime Valencia | 32.0% | 16.067 | 0.0573 |
| Average % to get 100 cps | 24.9% | | |
| Standard deviation | 4.3% | | |

Example 4

The effects on beverage attributes, such as particular flavors and mouthfeel, were tested by an expert panel in juice beverages having the same juice base but homogenized pulp provided from different orange varietals. The juice was NFC orange juice consisting of a blend of 60 weight % Valencia orange juice and 40 weight % Hamlin orange juice. Regarding flavors, a total of eighteen characteristics, including both desirable flavors and off-flavors, were analyzed by the expert panel for juice beverages having three ranges of measured viscosity: 56-65 cps (collectively referred to herein as "~60 cps"), 100-123 cps (collectively referred to herein as "~100 cps"), and 183-230 cps (collectively referred to herein as "~200 cps"). Regarding mouthfeel, a total of eight characteristics were determined by the expert panel for juice beverages having a viscosity of ~60 cps, ~100 cps and ~200 cps.

TABLE 5

Effect of orange varietal and amount of homogenized pulp on flavor characteristics - statistically significant change as compared to base juice

| Juice Beverage Containing Homogenized Pulp | Tangerine | Lemon | Raw Orange | Paint | Sweet |
|---|---|---|---|---|---|
| 15% Hamlin (~60 cps) | — | — | — | — | — |
| 15% Late Hamlin (~60 cps) | — | — | — | — | — |
| 15% Early Valencia (~60 cps) | — | — | — | — | slight increase |
| 25% Prime Valencia (~60 cps) | — | slight decrease | — | — | — |
| 25% Hamlin (~100 cps) | — | — | — | — | — |
| 25% Late Hamlin (~100 cps) | — | — | — | — | — |
| 25% Early Valencia (~100 cps) | — | — | — | slight decrease | — |
| 35% Prime Valencia (~100 cps) | — | — | — | slight decrease | — |
| 35% Hamlin (~200 cps) | decrease | — | — | — | — |
| 35% Late Hamlin (~200 cps) | decrease | — | slight decrease | — | — |
| 35% Early Valencia (~200 cps) | decrease | — | — | — | — |

Juice beverages exhibiting the three viscosity levels were prepared by including 15-35 weight % of homogenized pulp to the base juice. The statistically significant taste characteristics of the juice beverages tested, as compared to the base juice, are provided in Table 5 below. The statistically significant mouthfeel characteristics of the juice beverages tested, as compared to the base juice, are provided in Table 6 below.

TABLE 6

Effect of orange varietal and amount of homogenized pulp on mouthfeel characteristics - statistically significant change as compared to base juice

| Juice Beverage Containing Homogenized Pulp | Viscosity | Roll Viscosity | Manipulation Particle Amount | Mouthcoat Type | Residual Mouthcoat | Particle Size Type |
|---|---|---|---|---|---|---|
| 15% Hamlin (~60 cps) | increase | increase | — | increase | slight increase | — |
| 15% Late Hamlin (~60 cps) | increase | increase | — | increase | increase | — |
| 15% Early Valencia (~60 cps) | slight increase | increase | — | increase | slight increase | — |
| 25% Prime Valencia (~60 cps) | increase | increase | — | increase | increase | — |
| 25% Hamlin (~100 cps) | increase | increase | — | increase | increase | — |
| 25% Late Hamlin (~100 cps) | increase | increase | — | increase | increase | — |
| 25% Early Valencia (~100 cps) | increase | increase | — | increase | increase | increase |
| 35% Prime Valencia (~100 cps) | increase | increase | — | increase | increase | — |
| 35% Hamlin (~200 cps) | increase | increase | increase | — | increase | increase |
| 35% Late Hamlin (~200 cps) | increase | increase | increase | — | increase | increase |
| 35% Early Valencia (~200 cps) | increase | increase | increase | — | increase | increase |

Although it might have been expected that the added homogenized pulp would contribute to the overall flavor impression of a thick juice beverage, surprisingly, the panel results indicate that the inclusion of up to 35 weight percent homogenized pulp resulted in very little change to the flavor characteristics of the juice. For example, only the ~200 cps juice beverages provide a decrease in the positive attribute of "tangerine" flavor. In contrast to the flavor results, all of the thickened beverages exhibited statistically significant increases in several mouthfeel characteristics, as compared to the base juice. Each of the tested beverages showed an increase in viscosity, roll viscosity and residual mouthcoat over the base NFC orange juice. There was no particular trend, however, in the magnitude of the increase in the different mouthfeel characteristics as the amount of homogenized pulp was increased from ~60 cps to ~100 cps to ~200 cps.

It was further surprising that the beverages containing added homogenized pulp and having viscosities of ~60 cps or ~100 cps exhibited no significant increase in manipulation particle amount. The manipulation particle amount is the relative number of particles in the mouth after manipulation of the beverage, and is thus a characteristic that relates to the magnitude of a grainy or sandy mouthfeel of the beverage. Accordingly, a beverage that has a low manipulation particle amount lacks graininess or sandiness and instead exhibits a smooth mouthfeel. Unexpectedly, the addition of the homogenized pulp up to a viscosity of ~100 cps did not alter the smoothness of the beverage, and at a viscosity of ~200 cps the homogenized pulp increased the smoothness of the beverage, as compared to the base juice having no added homogenized pulp. Similarly, only one sample beverage having a viscosity of ~60 cps or ~100 cps (25% Early Valencia) provided a statistically significant increase in the particle size type as compared to the base juice having no added homogenized pulp. This is surprising because the tested samples contain up to 35% by weight of added particles, which have diameters of between about 40 microns and 700 microns.

Given the benefit of the above disclosure and description of exemplary embodiments, it will be apparent to those skilled in the art that numerous alternate and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

The invention claimed is:

1. A beverage comprising:
   base juice having a smooth mouthfeel and a taste profile; and
   between about 15% by weight and about 45% by weight of homogenized pulp having a particle size of between about 40 microns and about 700 microns in diameter,
   wherein the beverage has a measured viscosity between about 50 and about 125 cps at the time of manufacture and the beverage exhibits both a smooth mouthfeel and a taste profile that are not significantly different from that of the base juice.

2. The beverage of claim 1, wherein the beverage meets the standard of identity of a 100% juice.

3. The beverage of claim 1, further comprising added water.

4. The beverage of claim 1, wherein the measured viscosity is between about 80 and about 100 cps.

5. The beverage of claim 1, wherein the juice is orange juice.

6. The beverage of claim 1, wherein the homogenized pulp has an average diameter between about 40 microns and about 500 microns.

7. The beverage of claim 1, further comprising homogenized finisher-derived solids.

8. The beverage of claim 1, wherein the homogenized pulp comprises pulp from more than one varietal.

9. The beverage of claim 1, wherein the juice beverage comprises single-strength juice.

10. A beverage comprising:
   base juice having a smooth mouthfeel and a taste profile; and
   between about 15% by weight and about 40% by weight homogenized finisher-derived solids having a particle size between about 40 microns and about 1400 microns in diameter,
   wherein the beverage has a measured viscosity between about 50 and about 125 cps at the time of manufacture and the beverage exhibits both a smooth mouthfeel and a taste profile that are not significantly different from that of the base juice.

11. The beverage of claim 10, wherein the beverage meets the standard of identity of a 100% juice.

12. The beverage of claim 10, wherein the measured viscosity is between about 80 and about 100 cps.

13. The beverage of claim 10, wherein the homogenized finisher-derived solids comprise at least two materials selected from the group consisting of materials from: membranes, cellulosic materials, peel, seeds, and sensible pulp.

14. A beverage comprising:
   base juice having a smooth mouthfeel and a taste profile;
   homogenized finisher-derived solids having a particle size between about 40 microns and about 1500 microns in diameter; and
   homogenized pulp having a particle size between about 40 microns and about 750 microns in diameter,
   wherein the beverage has a measured viscosity between about 50 and about 125 cps at the time of manufacture and the beverage exhibits a taste profile that is not significantly different from that of the base juice.

15. The beverage of claim 14, wherein the beverage has a measured viscosity between about 80 and about 100 cps at the time of manufacture.

16. The beverage of claim 14, wherein the homogenized finisher-derived solids have a particle size between about 40 microns and about 1400 microns in diameter.

17. The beverage of claim 14, wherein the beverage meets the standard of identity of a 100% juice.

18. The beverage of claim 14, wherein the beverage comprises at least 15% by weight homogenized finisher-derived solids.

19. A beverage consisting essentially of:
   base juice having a smooth mouthfeel and a taste profile; and
   between about 15% by weight and about 45% by weight of homogenized pulp having a particle size of between about 40 microns and about 700 microns in diameter,
   wherein the beverage has a measured viscosity between about 50 and about 125 cps at the time of manufacture and the beverage exhibits both a smooth mouthfeel and a taste profile that are not significantly different from that of the base juice.

20. The beverage of claim 19, wherein the measured viscosity is between about 80 and about 100 cps.

21. The beverage of claim 19, wherein the juice is not from concentrate orange juice.

* * * * *